(12) United States Patent
Ose (10) Patent No.: US 6,460,899 B1
(45) Date of Patent: *Oct. 8, 2002

(54) DISCONNECT COUPLING

(75) Inventor: Paul N. Ose, Ramsey, MN (US)

(73) Assignee: Airmo, Inc., Minneapolis, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/248,612

(22) Filed: Feb. 11, 1999

(51) Int. Cl.[7] .................................................. F16L 37/18

(52) U.S. Cl. ........................ 285/316; 285/314; 285/315

(58) Field of Search ................................. 285/314, 315, 285/316, 81, 84, 86

(56) References Cited

U.S. PATENT DOCUMENTS

| 3,390,898 A | * | 7/1968 | Sumida | 285/34 |
| 4,216,982 A | * | 8/1980 | Chow | 285/315 |
| 4,982,761 A | * | 1/1991 | Kreczko et al. | 285/316 |
| 5,310,226 A | * | 5/1994 | Norkey | 285/316 |
| 5,984,266 A | * | 11/1999 | Kotake | 285/316 |

* cited by examiner

Primary Examiner—Lynne H. Browne
Assistant Examiner—Aaron Dunwoody
(74) Attorney, Agent, or Firm—Moore & Hansen (57) ABSTRACT

A disconnect coupling for high pressure fluidic lines has an improved retaining mechanism for retaining the male portion within the female portion. The mechanism comprises a plurality of retaining lugs that are disposed within the female portion of the coupling. The retaining lugs are arranged so as to mate with a retaining groove formed into the outer surface of the male portion such that the bearing surfaces contact each other over a much-increased surface area.

2 Claims, 6 Drawing Sheets

DISCONNECT COUPLING

BACKGROUND OF THE INVENTION

The present invention is directed to a disconnect coupling, and more specifically, to an improved apparatus for retaining a male portion of a disconnect coupling within a bore of a female portion of a disconnect coupling.

Disconnect couplings, commonly referred to as quick-disconnect couplings, are highly desirable for use in both hydraulic and pneumatic applications. Furthermore, in certain specialized applications it is essential that a quick disconnect coupling be capable of withstanding extremely high pressures in the lines being connected through the coupling. In hydraulic applications, for example, it is possible for the pressures applied to a coupling to exceed 60,000 pounds per square inch.

The state of the art disconnect coupling utilizes a plurality of generally spherical ball bearings secured within the female portion of the coupling that are releaseably received in a retaining groove formed in a male portion of the disconnect coupling to securely retain the male portion of the coupling within the female portion of the coupling. This type of disconnect coupling functions acceptably where moderate pressures are applied across the disconnect coupling. However, under higher pressures ball bearing type disconnect couplings can fail due to deformation of the bearing surfaces within the retaining groove in the male portion of the coupling. Because the spherical ball bearings of this type of coupling contact the bearing surface of the retaining groove in the male portion of the coupling at a very small area which can almost be characterized as a single point, these ball bearings will subject the bearing surface of the retaining groove to point stresses which regularly exceed the ultimate strength of the material of the male portion of the coupling. Deformation of the bearing surface of the retaining groove makes it more likely that the male and female portions of the coupling will fail to properly engage one another. In addition, ball bearings in ball bearing type disconnect couplings tend to translate a disproportionately large amount of the longitudinal forces applied across the ball bearings and retaining groove into radial forces directed in a normal direction relative to the longitudinal axis of the coupling and applied to the female portion of the disconnect coupling. Repeated application of these radially outwardly directed forces to the female portion of the coupling may deform or even shatter the female portion of the coupling.

One solution to the problems associated with ball bearing type disconnect couplings presently on the market, has been the utilization of a female portion having a retaining means with a curved surface which contacts the bearing surface in the retaining groove on the male portion. of the coupling along an arc. Increasing the amount of contact between the retaining means and the bearing surface of the retaining groove of the male portion of the coupling helps to decrease the magnitude of the stresses applied to the bearing surface of the male portion. However, the area of contact is a line and is still relatively small; therefore the stresses applied to the bearing surfaces can exceed the ultimate strength of the material from which the bearing surface of the male portion is fabricated. In addition, the curved surface of the retaining means, like the curved surface of the ball bearing, directs an unacceptably high amount of force in an outward radial direction into the female portion of the coupling.

Therefore, it is an object of the invention to provide a structure for a retaining mechanism that will impart substantially lower stresses to the bearing surfaces of the male portion of the coupling. It is also an objective of the present invention to provide a structure for a retaining mechanism which minimizes the magnitude of the radial forces applied to the female portion of the coupling. A last objective of the present invention is to provide a structure for a retaining mechanism having a large cross-sectional area for resisting shear stresses and which is capable of evenly distributing applied shear stresses around the bearing surfaces of the retaining groove of the male portion of the coupling.

SUMMARY OF THE INVENTION

The present invention comprises a disconnect coupling that is connectable to high pressure fluidic lines. The coupling of the present invention has a female portion with a means for connecting it to a fluidic line. The female portion has a housing with a longitudinal axis and a fluid flow channel formed therethrough along the longitudinal axis. The coupling also has a male portion which also has means for connecting it to a fluidic line. The male portion of the coupling is receivable within the channel of the female portion. In addition, the male portion has a fluid flow passage formed therethrough along a longitudinal axis, with the passage positioned so as to communicate with the channel of the female portion when the male and female portions are connected.

A retaining mechanism for quickly connecting and disconnecting the male and female portions is provided and comprises a plurality of retaining lugs that are moveably mounted within the housing of the female portion so as to be capable of engaging the male portion of the coupling. The retaining lugs are slidably movable between a locking position, wherein the lugs extend within the channel to engage the male portion, and a release position, wherein the lugs are substantially retracted within the housing of the female portion so as to permit placement or removal of the male portion of the coupling in or from the channel of the female portion of the coupling.

A retaining groove is formed around the male portion and is positioned so as to receive the retaining lugs when the male portion is connected to the female portion and the lugs are in their locking position. Of importance here is that both the retaining groove and the retaining lugs have bearing surfaces that are congruent to one another. A collar is slidably mounted on the female portion of the coupling and is moveable between a first position, wherein the collar lockably maintains the retaining lugs in their locking position, and a second position wherein the collar permits the retaining lugs to be moved to their release position.

It is preferred that the bearing surfaces of the retaining lug and of the retaining groove have substantially the same surface geometry as a frustum of a right circular cone. In this case, the right circular cone which defines the bearing surfaces of the preferably annular retaining groove and the retaining lugs has an axis of symmetry that coincides with the longitudinal axes of the female and male portions of the coupling. The shape of the respective bearing surfaces of the retaining lugs and retaining groove permits substantially full facial contact therebetween when the male and female portions of the coupling are connected and the retaining lugs are lockably retained in the retaining groove by the collar.

The retaining lug of the present invention has a body with a tip and a base, with the base being received within the female portion of the disconnect fluid coupling. The tip of the retaining lug has at least one bearing surface formed thereon, with the bearing surface being arranged and constructed to mate with a congruent bearing surface that is formed in male portion of the disconnect fluid coupling. The respective bearing surfaces of the tip of the retaining lug and the male portion of the coupling define an area of contact that has a substantial surface area.

The inner and outer bearing surfaces of the retaining lug are inclined at an angle of no more than 30 degrees as measured from a plane perpendicular to the longitudinal axis of the disconnect coupling. Preferably the inner and outer bearing surfaces of the retaining lug are angled at approximately 20 degrees as measured from a plane perpendicular to the longitudinal axis of the disconnect coupling.

The retaining lug according to the present invention takes the shape of a radial section of a right cylinder and preferably has bearing surfaces that have the geometric shape of the surface of a section of a frustum of a right circular cone. The base the retaining lug generally also has a lip formed thereto which prevents the lug from sliding into the channel of the female portion of the disconnect fluid coupling. Each retaining lug may span between 30 and 60 degrees of the circumference of the annular bearing surface of the retaining groove. However, it is preferred that the retaining lugs span no more than 45 degrees of the circumference of the channel of the housing of the female portion. Furthermore, it is also preferred that each lug have at least one bearing surface that is at least 0.1 square inches in area.

These and other objectives and advantages of the present invention will become apparent from the following detailed description and illustrative drawings when read in conjunction with the appended claims.

DESCRIPTION OF THE DRAWINGS

FIG. 3 is an exploded view of the female portion of the coupling of FIG. 1 showing all of the component parts of the female portion of the coupling and their relation to each other.

DESCRIPTION OF THE PREFERRED EMBODIMENT

Figure 1:
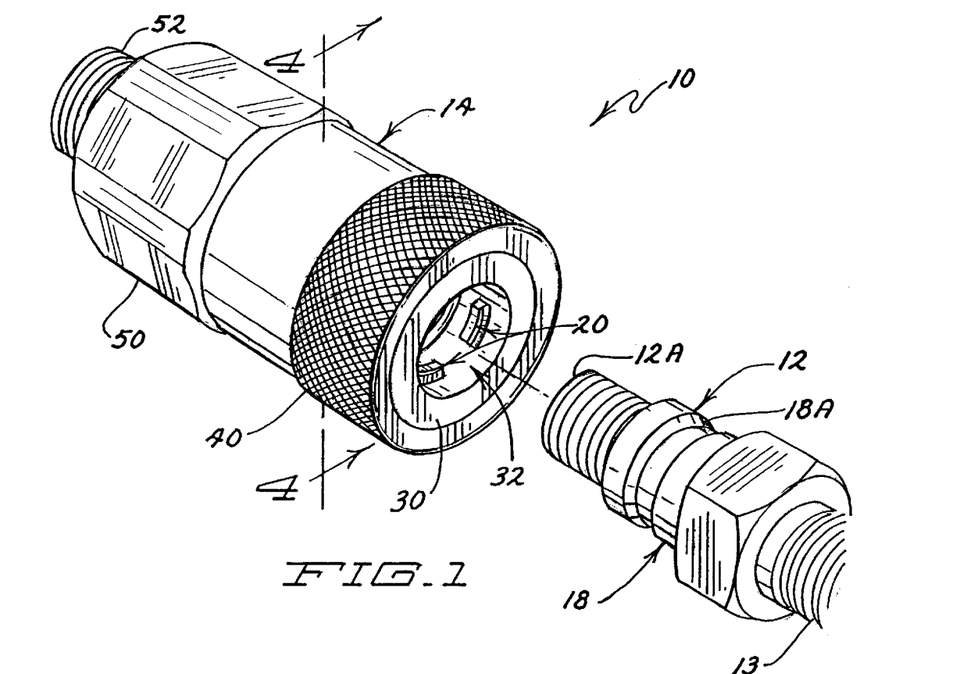
FIG. 1 is a perspective view of a disconnect coupling embodying the invention and illustrating the male and female portions of the coupling and their relation to one another.
Figure 2:
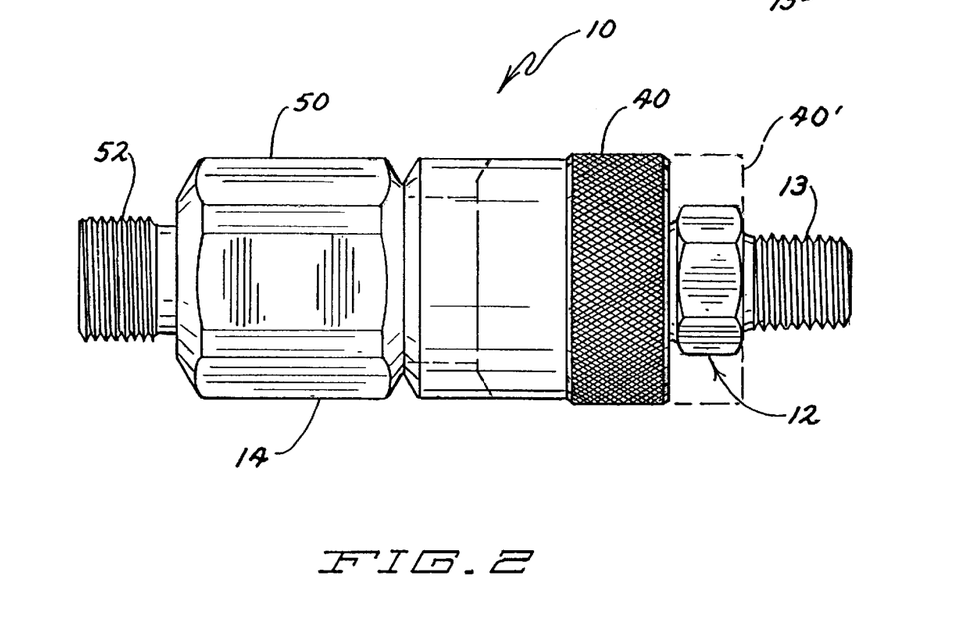
FIG. 2 is a side elevational view of the coupling of FIG. 1 wherein the male portion, or nipple, of the coupling is seated within the female portion of the coupling.

Referring to FIGS. 1 and 2, it can be seen that the disconnect coupling 10 embodying the invention is comprised of two separate portions, a male portion or nipple 12, and a female portion 14. Each of the portions 12, 14 will be coupled during normal use by respective attachment means 13 and 52, to a hydraulic or pneumatic line (not shown).

The nipple 12 is arranged to be received within a channel 32 that extends axially through the female portion 14 of the coupling 10. Nipple 12 has a axial passage 32A formed therethrough which communicates with channel 32 formed through the female portion 14 of coupling 10. The nipple 12 is releaseably retained within the female portion 14 by a plurality of retaining lugs 20 whose structure and function will be described in detail below. The coupling 10 of the present invention may be used to connect fluidic lines carrying various compressed fluids including air, water and hydraulic fluids.

FIGS. 3–6 illustrate the female portion 14 of the coupling 10, which is comprised of a housing 30, a shell 40, a rear cap 50, a valve seat 60, and a poppet valve assembly 70. The rear cap 50 is a generally cylindrical structure through which the channel 32 passes. The rear cap 50 also has a hydraulic line attachment means 52 for connecting the female portion 14 of the coupling 10 to a hydraulic line, and a threaded portion 54 formed on the inner surface of the rear cap 50 around channel 32. The housing 30 is also a generally cylindrical structure through which the channel 32 passes. The housing 30 has a threaded portion 34 arranged to be received within the threaded portion 54 of the rear cap 50. Valve seat 60 is arranged to be caught between the rear cap 50 and the housing 30 of the female portion 14 of the coupling 10 so as to form a tight seal therebetween. Valve seat 60 also has channel 32 extending therethrough. The sealing portion 62 of the valve seat 60 is interposed directly between the end of the housing 30 and a shoulder 56 formed into the rear cap 50 within the channel 32. Preferably, the valve seat 60 will be fashioned of a material that is relatively softer than the materials from which the housing 30 and the rear cap 50 are fabricated so that when the sealing portion 62 of the valve seat 60 is caught between the housing 30 and rear cap 50, it will be deformed to conform to the shape of the housing 30 and the rear cap 50, thereby forming a tight seal therebetween.

The valve seat 60 receives the components of the poppet valve assembly 70. The poppet 72 has a conical sealing end 72A and a threaded end 72B. The sealing end 72A of the poppet 72 is substantially conical and is received against a congruent conical mating surface 62A of the valve seat 60. The threaded end 72B of the poppet 72 extends through and out of the valve seat 60 and into the channel 32 of the housing 30. In order to form a tight seal between the conical mating surface 62A of the valve seat 60 and the sealing end 72A of the poppet 72, the conical sealing end 72A of the poppet 72 is provided with an O ring 73A which is seated in annular groove 71. Backup ring 73B retains the O-ring 73A in annular groove 71 of the sealing end 72A of the poppet 72. The sealing end 72A of the poppet 72 is biased into sealing contact with the valve seat 60 by spring 74. One end of the spring 74 bears against a shoulder 66 formed into the valve seat 60 within channel 32 and the other end of the spring 74 bears against a sprocket 76 received onto the threaded end 72B of the poppet 72. Sprocket 76 in turn bears against a shoulder 77A formed into the poppet actuator bushing 77. Poppet actuator bushing 77 is received within the channel 32 of housing 30 and is free to slide longitudinally between the end of the valve seat 60 and a shoulder 33 formed into the inner surface of the housing 30. A nut 78 is threaded onto the threaded end 72B of the poppet 72 so as to retain the sprocket 76 on the poppet 72, and thereby capturing the spring 74 between the sprocket 76 and the shoulder 66 formed into the valve seat 60.

The housing 30 also includes an annular sealing slot 35 formed into its inner surface around channel 32. The sealing slot 35 has contained therein an O-ring 35A and a backup ring 35B which retains the O-ring within the sealing slot 35. O-ring 35A acts to form a seal around the nipple 12 when the nipple 12 is received within the channel 32 of the housing 30.

Figure 5:
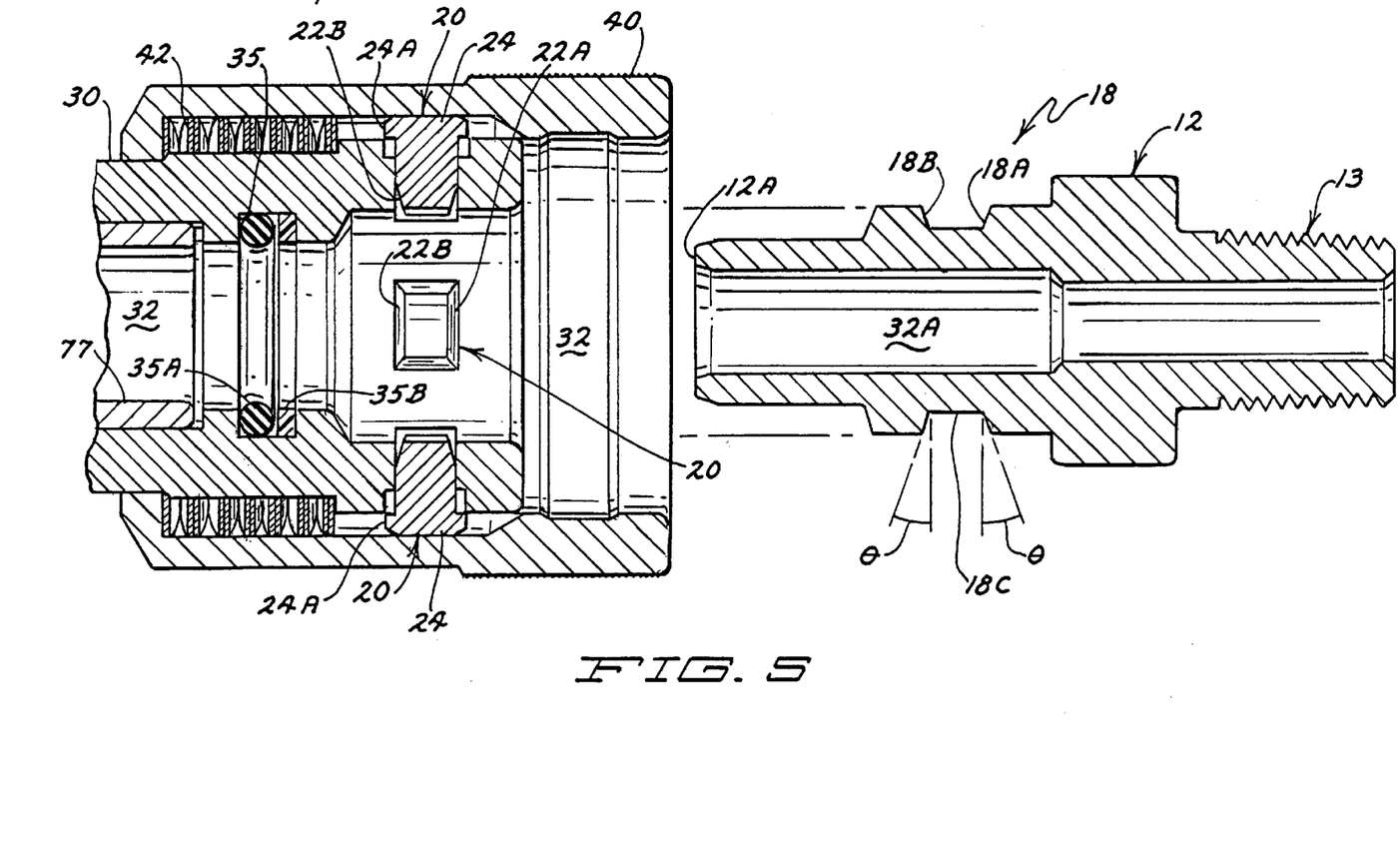
FIG. 5 is a cross sectional view of the male portion of the coupling and a partial cross sectional view of the female portion of the coupling illustrating the relationship of the exterior contours of the male portion of the coupling to the interior contours of the female portion of the coupling.
Figure 6:
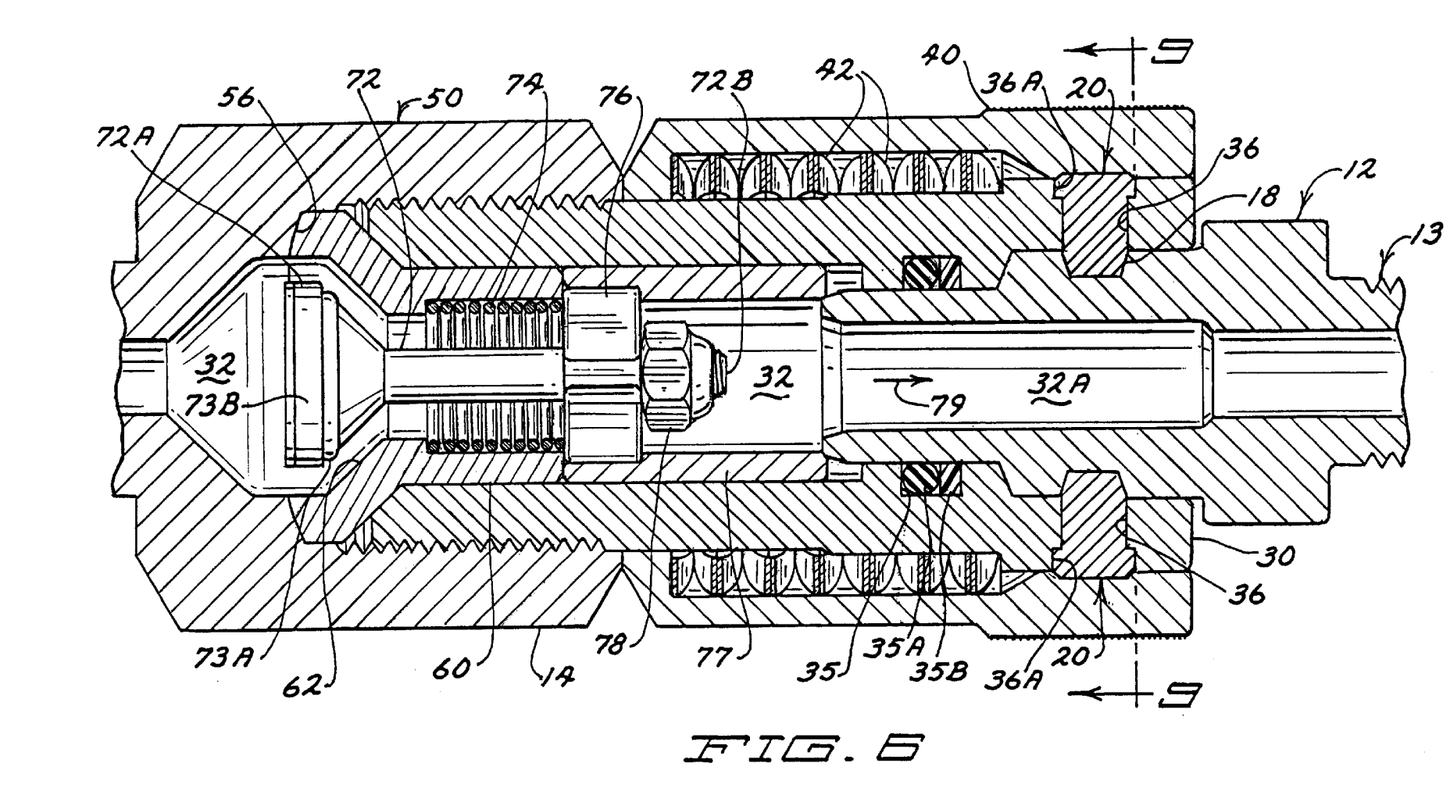
FIG. 6 is a cross sectional view of the coupling wherein the male portion of the coupling is received and retained within the female portion of the coupling.

When the nipple 12 is inserted into the channel 32 of the housing 30 as illustrated in FIGS. 5 and 6, the end 12A of the nipple 12 bears against the poppet actuator bushing 77, forcing poppet 72 to slide longitudinally within the channel 32 toward the rear cap 50, and in doing so, breaking the seal between the O-ring 73A and the conical mating surface 62A of the valve seat 60 (FIG. 6) to allow compressed hydraulic fluid to flow past the sealing end 72A of the poppet 72 in direction 79, passing through openings around sprocket 76. When nipple 12 is fully received with the female portion 14 of the coupling 10, hydraulic fluids may pass through channel 32 to passage 32A and vice versa. The nipple 12 and the housing 30 are arranged such that when the end 12A of the nipple 12 has opened the poppet valve assembly 70. An annular retaining groove 18 formed into the nipple 12 is simultaneously aligned to receive a plurality of retaining lugs 20 disposed around the inner surface of the housing 30. Retaining lugs 20 are biased by collar 40 into the retaining groove 18 of the nipple 12 so as to couple the male portion 12 of the coupling 10 to the female portion 14. In this coupled state, the coupling 10 may conduct compressed or pressurized fluids therethrough.

Figure 4:
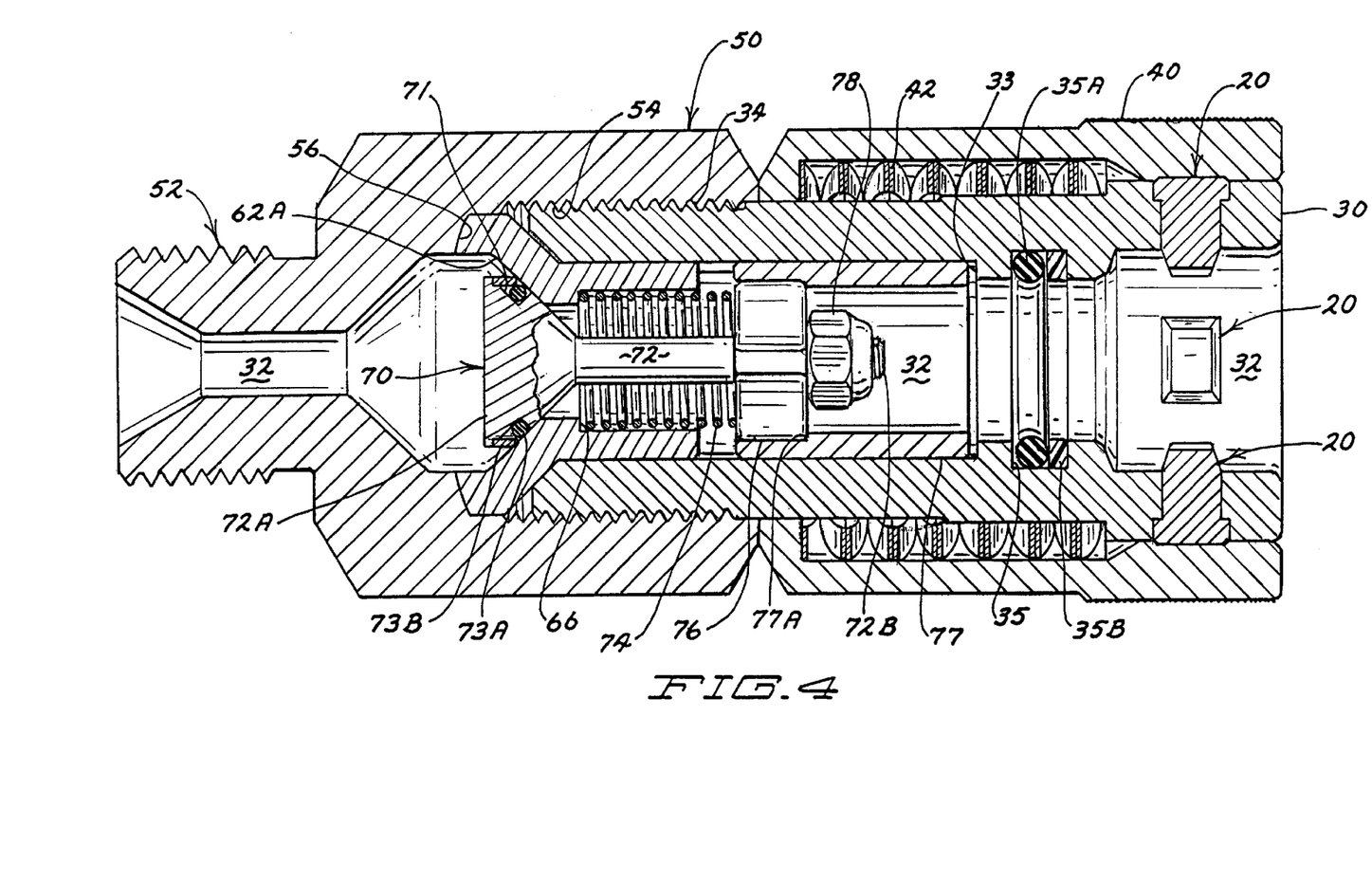
FIG. 4 is a cross sectional view of the female portion of the fully assembled coupling taken along cutting plane 4—4 of FIG. 1.

The retaining lugs 20 are disposed within a plurality of apertures 36 formed through the housing 30 adjacent the front end of the housing. In the preferred embodiment of the present invention, the apertures 36 are symmetrically arranged around the channel 32 and extended radially outward through the cylindrical wall of the housing 30. In addition, it is preferred to have an even number of apertures 36 formed into the housing 30. Accordingly, the preferred embodiment of the present invention comprises four retaining lugs 20. Furthermore, it is preferred that the total combined arc length of the apertures 36 formed into the of the housing 30 span approximately 180 degrees of the circumference of the channel 32. In the preferred embodiment of the present invention, the total combined arc length of the apertures, and hence of the retaining lugs 20, is 180°, each retaining lug 20 of the preferred embodiment spanning 45°. It must be understood, however, that so long as the symmetry of the arrangement of the apertures 36, and hence the arrangement of the retaining lugs 20, is maintained, there may be formed into the housing 30 an odd number of apertures 36. Likewise, the apertures 36 formed through the housing 30 and associated retaining lugs 20 may span more or less than 180 degrees of the circumference of the channel 32 formed through the housing 30 depending upon the particular nature of the application for which the coupling 10 is intended. For example, with suitable structural variations in the housing 30 to maintain the structural integrity of the coupling 10, the retaining lugs 20 may span between 30 and 60 degrees of the circumference of the channel 32. Numerous variations in the number and in the angular span of the apertures 36 within the housing 30 and retaining lugs 20 are suitably functional and are within the purview of the present invention.

Figure 7:
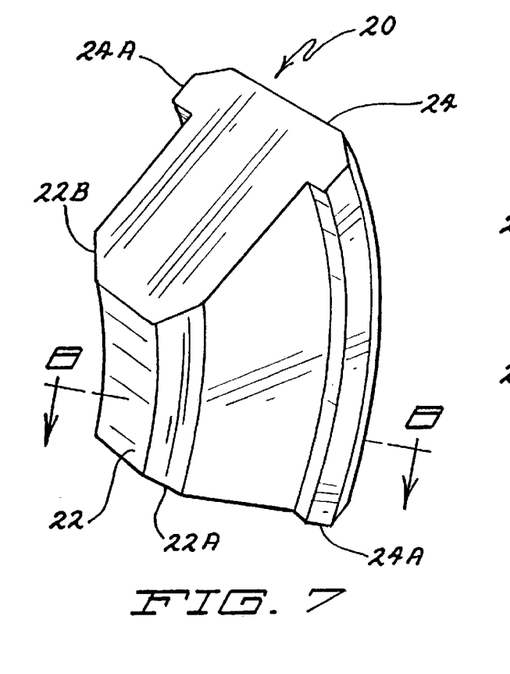
FIG. 7 is a perspective view of a retaining lug embodying the invention.
Figure 8:
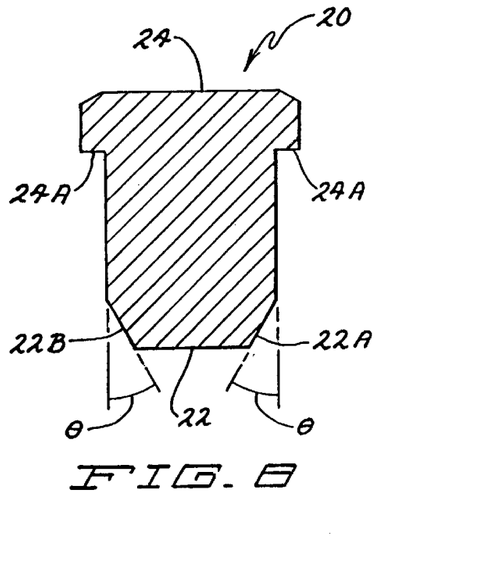
FIG. 8 is a cross sectional view of a retaining lug taken along cutting line 8—8 of FIG. 7.
Figure 9:
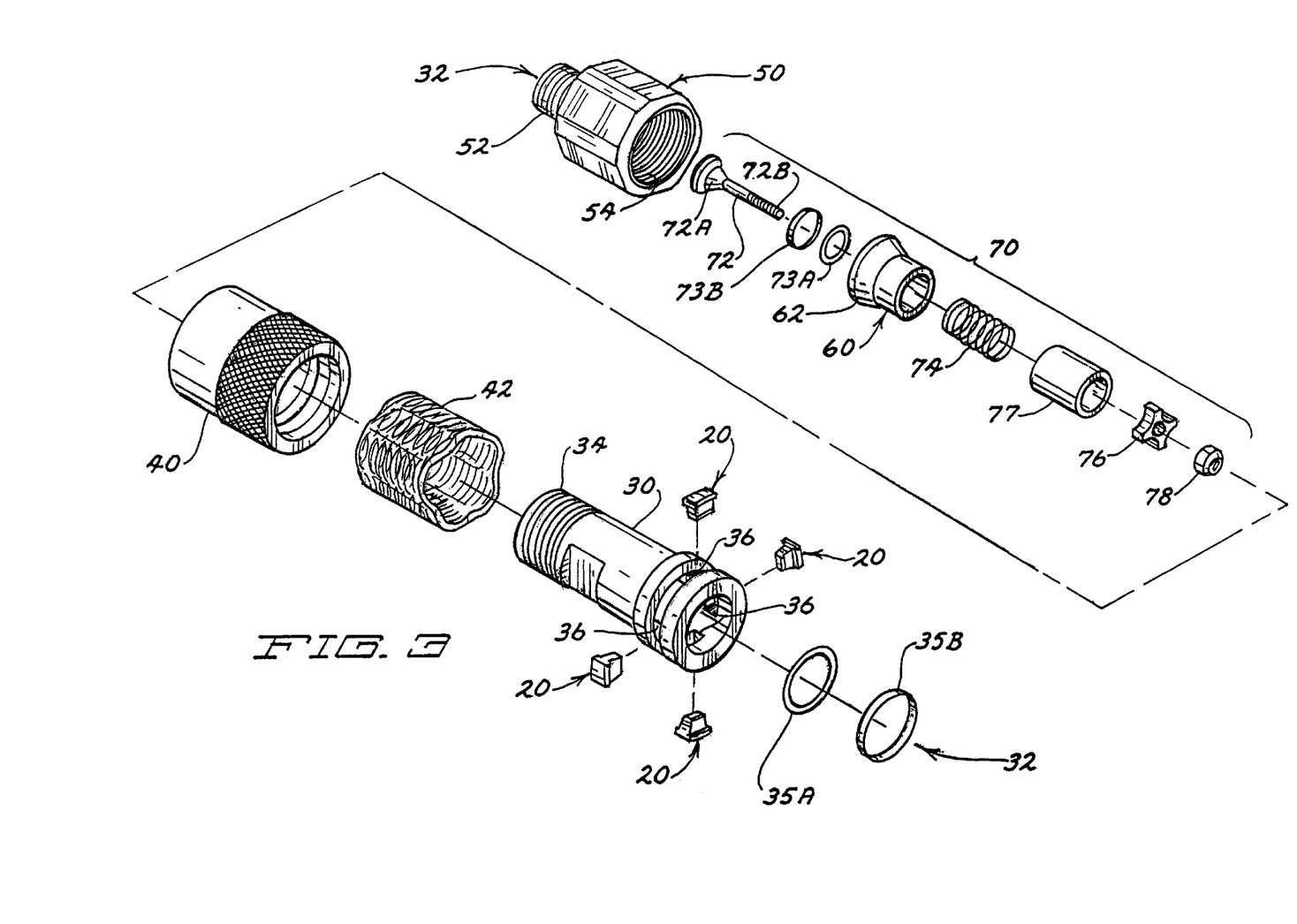
FIG. 9 is an end view of the arrangement of the respective retaining lugs, taken in the direction of cutting plane 9—9 of FIG. 6, the retaining lugs being illustrated in a first locked position in solid lines, and in a second open or release position in phantom.

As each of the retaining lugs 20 are substantially identical, only one of the retaining lugs 20 will be described in detail. Referring now to FIGS. 7, 8 and 9 it can be seen that the retaining lug 20 is essentially a radial section of a right cylindrical ring, having a tip 22 and a base 24. The tip 22 of the retaining lug 20 is chamfered to create an inner bearing surface 22A and an outer bearing surface 22B. The retaining lug 20 also includes a pair of lips 24A formed integral with the base 24 thereof.

The lips 24A of the preferred embodiments of the retaining lug 20 have a substantially cylindrical under surface. Each of the apertures 36 in the housing 30 extends entirely through the wall of the housing 30 and further includes a pair of recessed shoulders 36A sized to receive the lips 24A of the retaining lug 20 so that base 24 may be positioned flush with the outer surface of the housing 30 when the collar 40 is in a locking position.

Collar 40 is received over the housing 30 and is longitudinally slidable over the housing 30 between a first, locking position indicated in FIG. 2 at 40 and a second, release position indicated at 40'. The collar 40 is normally biased into its locking position by a spring 42 disposed between the collar 40 and the housing 30 as illustrated in FIG. 6. In the locking position, the collar 40 forces the retaining lugs 20 into their respective apertures 36 such that the base 24 of each retaining lug 20 are substantially flush with the outer surface of the housing 30 and such that the tip 22 of each retaining 20 is fully extended into the channel 32 formed through the housing 30. When the collar 40 is moved away from the rear cap 50 to its open position, 40', the retaining lugs 20 are free to travel radially outward away from the channel 32 of housing 30 to their release position as indicated at 20' in FIG. 9. In this release position, the nipple 12 may be inserted or removed from the channel 32. As the nipple 12 is inserted or removed from the channel 32, the retaining lugs 20 are forced radially outward and out of the channel 32. Returning the collar 40 to its locking position forces the retaining lugs 20 radially inwardly to engage the retaining groove 18 when the nipple 12 is positioned within the channel 32 as shown in FIG. 6 or to simply extend into the channel if the nipple 12 is not positioned within the channel 32 as in FIG. 4.

When the nipple 12 is received within the channel 32 and the collar 40 is in its locking position, the tips 22 of the retaining lugs 20 are received within the retaining groove 18 formed around the outer surface. of the nipple 12. As depicted in FIG. 5, the retaining groove 18 has inner and outer bearing surfaces 18A and 18B that correspond to the congruent bearing surfaces 22A and 22B of the tip 22 of the retaining lugs 20. The chamfers that form the respective bearing surfaces 22A, 22B of the tip 22 of the retaining lugs 20 and the bearing surfaces 18A, 18B of the retaining groove 18 are cut at an identical angle θ, illustrated in FIGS. 5 and 8, such that the respective bearing surfaces of the retaining lugs 20 and retaining groove 18 will flushly contact one another across a substantial surface area as opposed to along a line or at a single point.

The bearing surfaces 22A and 22B and 18A and 18B of the retaining lugs 20 and retaining 20 groove 18, respectively have any useful, congruent profile formed therein. However, the respective bearing surfaces 22A and 22B of the retaining lugs 20 are preferably frusto-conical surfaces defined by the chamfer angle θ and the radius of the coupling 10. Mating surfaces 18A and 18B are preferably also frusto-conical surfaces defined by the same chamfer angle θ and the radius of the coupling 10. The cone defining the frusto-conical surface of the bearing surfaces of the retaining lugs 20 and the retaining groove 18 is preferably a right circular cone. The bearing surfaces 22A, 22B comprise only a section of a frustum of the right circular cone which defines the preferred form of the respective bearing surfaces of both the retaining lug and groove. Furthermore, bearing surfaces 22A and 22B and mating surfaces 18A and 18B are congruent, thereby ensuring that there will be substantially full facial contact between the bearing surfaces 22A and 22B and the mating surfaces 18A and 18B, at the locations where the retaining lugs 20 are extended into the retaining groove 18. What is more, the surface of the tip 22 is preferably cylindrical and congruent with the preferably cylindrical surface of the bottom 18C of the retaining groove 18. This congruence permits the retaining lugs 20 to be fully inserted into the retaining groove 18 and facilitates the full facial contact between the bearing surfaces 22A and 22B of the retaining lugs 20, and the mating surfaces 18A and 18B of the retaining groove 18. In the present, preferred embodiment the angle θ is 20 degrees. However, in no case should the angle θ exceed 30 degrees. It is possible that the angle θ could even be zero degrees, however, an exceedingly small angle θ on mating surfaces 18A, 18B and 22A, 22B makes it difficult for the retaining lugs 20 to consistently engage the retaining groove 18 in a reliable manner. But, by maintaining a relatively small angle θ, there is the added benefit that the pressures exerted by the compressed hydraulic fluids flowing through the coupling 10 are in large part borne in shear over a substantial surface area by the retaining lugs 20. As the amount of force transmitted by the retaining lugs 20 to the collar 40 is a function of the angle of contact θ between the respective bearing surfaces 18A, 18B and 22A, 22B, maintaining a small angle θ on the bearing surfaces 18A, 18B and 22A, 22B reduces the proportion of the magnitude of the forces applied longitudinally across the retaining lugs 20 that is transmitted radially to the collar 40. Therefore, the angle θ is preferably as small as possible. The incidence of failure of the coupling 10 due to the deformation of the collar 4O is, therefore, correspondingly lower. Furthermore, the increased area of contact between the respective mating surfaces 18A, 18B and 22A, 22B reduces the stresses applied directly to those mating surfaces, thereby minimizing the potential for failure of the coupling 10 due to deformation of those mating surfaces.

The base 24 of retaining lugs 20 is preferably a cylindrical surface and will be congruent with the inner surface of the collar 40. The congruent base 24 and inner surface of the collar 40 flushly contact one another across substantially the entire surface of the base 24 of the retaining lug. In this manner, any radial force applied to the collar 40 by the retaining lugs 20 is applied over a surface area that is substantially larger than the point or line contact areas typically seen in couplings of the prior art.

In the preferred embodiment of the present invention, and for a coupling arranged to connect ¾ diameter fluid lines, the area of contact between the bearing surfaces 22A, 22B and the bearing surfaces 18A, 18B is approximately 0.14 square inches for each bearing surface of each retaining lug 20. This area of contact between the bearing surfaces of the retaining lugs 20 and the bearing surfaces of the retaining groove 18 may vary with the application or size of the coupling 10, but should not be lower than 0.1 square inches for the bearing surfaces of retaining lugs 20 intended for use with ¾ in. diameter fluid flow lines. Likewise, the increased area in shear represented by the cross-sectional area of the retaining lugs 20 reduces the likelihood of failure of the coupling 10 due to breakage or deformation of the retaining lugs 20 themselves.

While the preferred embodiment of the present invention has been described, it should be understood that various changes, adaptations and modifications may be made therein without departing from the spirit of the invention and the scope of the appended claims.

What is claimed is:

1. A disconnect coupling connectable to high pressure fluidic lines comprising:

a female portion connectable to a fluidic line and having a longitudinal axis and a housing, a fluid flow channel extending through said housing and positioned along said axis;

a male portion connectable to a fluidic line, said male portion having a longitudinal axis and being receivable within said channel of said female portion for releasable connection to said female portion, said male portion having a fluid flow passage extending through said male portion and along said male portion axis, said passage positioned to communicate with said channel of said female portion when said male portion is received within said female portion; and a retaining mechanism for quickly connecting and disconnecting said male and female portions, said retaining mechanism comprising:

a plurality of retaining lugs moveably mounted within said housing of said female portion, said lugs movable between a locking position, wherein said lugs extend within said channel to engage said male portion, and a release position, wherein said lugs are substantially retracted within said housing of said female portion said retaining lugs including a body whose cross section is a radial section of a right cylindrical ring;

a retaining groove formed in said male portion and positioned to receive said retaining lugs when said male portion is connected to said female portion and said lugs are in said locking position, said retaining groove including a first bearing surface;

each said retaining lug having a bearing surface substantially congruent to said bearing surface of said retaining groove; and a collar slidably mounted on said female portion for movement between a first position, wherein said retaining lugs are lockably retained in said locking position, and a second position wherein said retaining lugs may move between said locking position and said release position.

2. A disconnect coupling connectable to high pressure fluidic lines comprising:

a female portion connectable to a fluidic line and having a longitudinal axis and a housing, a fluid flow channel extending through said housing and positioned along said axis;

a male portion connnectable to a fluidic line, said male portion having a longitudinal axis and being receivable within said channel of said female portion for releasable connection to said female portion, said male portion having a fluid flow passage extending through said male portion and along said male portion axis, said passage positioned to communicate with said channel of said female portion when said male portion is received within said female portion; and a retaining mechanism for quickly connecting and disconnecting said male and female portions, said retaining mechanism comprising:

a plurality of retaining lugs moveably mounted within said housing of said female portion, said lugs movable between a locking position, wherein said lugs extend within said channel to engage said male portion, and a release position, wherein said lugs are substantially retracted within said housing of said female portion;

a retaining groove formed in said male portion and positioned to receive said retaining lugs when said male portion is connected to said female portion and said lugs are in said locking position, said retaining groove including a first bearing surfaces;

each said retaining lug having a bearing surface substantially congruent to said bearing surface of said retaining groove;

said female portion including a plurality of apertures for slidably receiving said retaining lugs, each said aperture including a pair of shoulders therein, each said retaining lug including a base, and each said base including a pair of lugs constructed and arranged to be congruent with and to contact said pair of congruent shoulders of a said aperture;

each of said retaining lugs having a pair of spaced apart substantially planar sides and each said aperture having a pair of substantially planar inner surfaces, said planar sides of each said retaining lug being in substantially full facial contact with the substantially planar inner surfaces of each said aperture; and a collar slidably mounted on said female portion for movement between a first position, wherein said retaining lugs are lockably retained in said locking position, and a second position wherein said retaining lugs may move between said locking position and said release position.

* * * * *

UNITED STATES PATENT AND TRADEMARK OFFICE
CERTIFICATE OF CORRECTION

PATENT NO. : 6,460,899 B1
DATED : October 8, 2002
INVENTOR(S) : Paul N. Ose

It is certified that error appears in the above-identified patent and that said Letters Patent is hereby corrected as shown below:

Column 8,
Line 52, delete "connnectable" and insert therefor -- connectable --;

Column 9,
Line 8, delete "surfaces" and insert therefor -- surface --;
Line 16, delete "lugs" and insert therefor -- lips --

Signed and Sealed this

Tenth Day of June, 2003

JAMES E. ROGAN
*Director of the United States Patent and Trademark Office*